D. C. BRYAN.
VEHICLE TRAILING DEVICE.
APPLICATION FILED MAY 24, 1912.
1,087,210.
Patented Feb. 17, 1914.
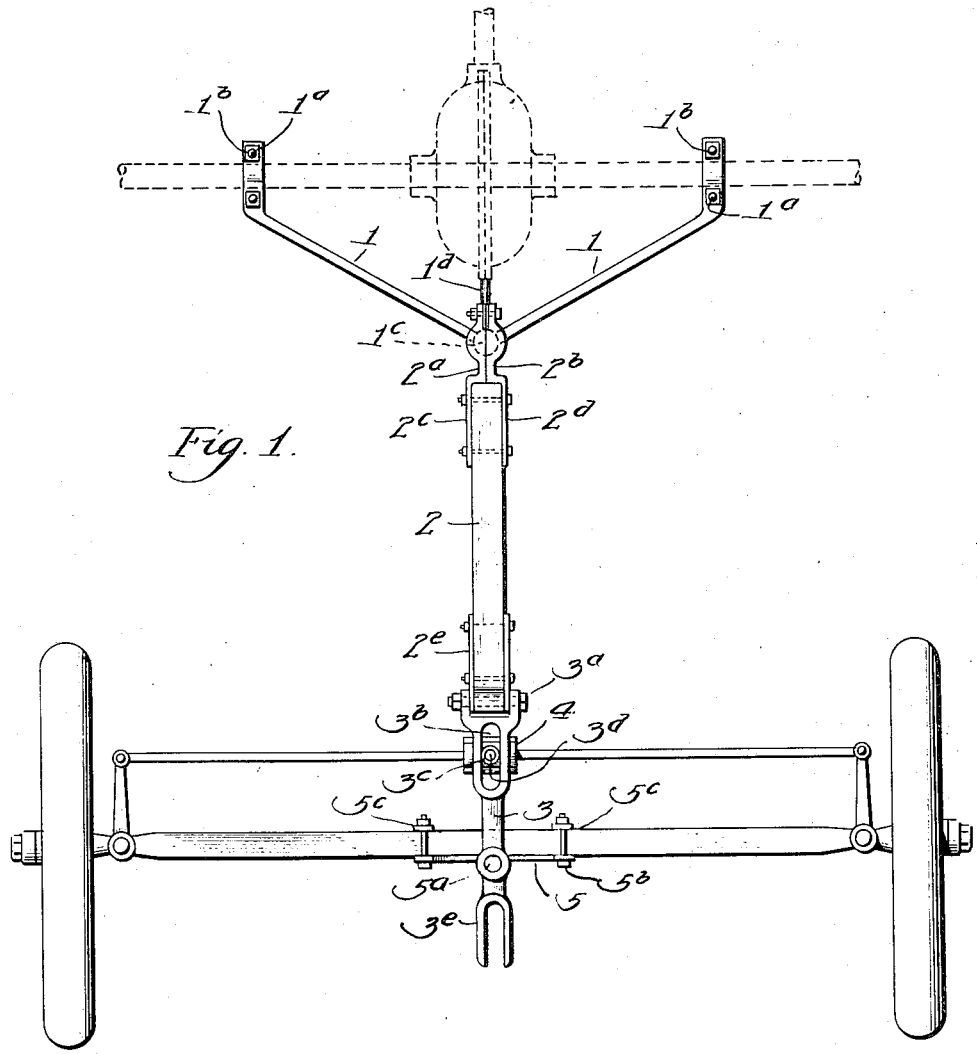
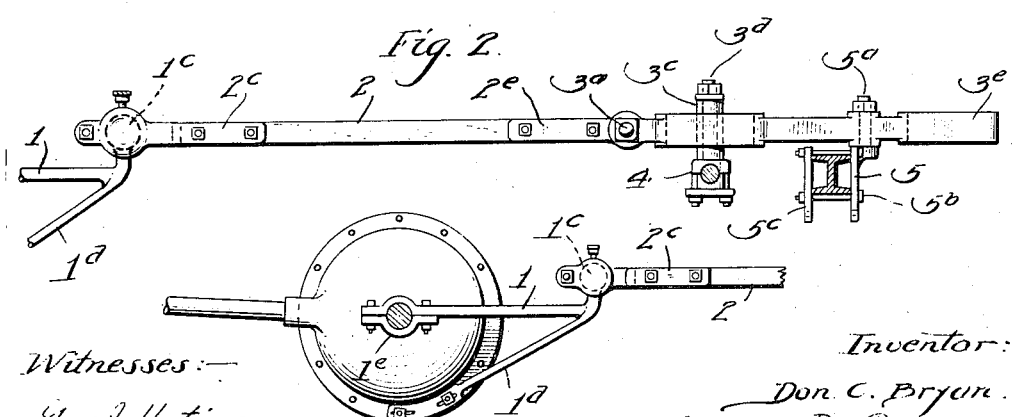

UNITED STATES PATENT OFFICE.

DON C. BRYAN, OF SAN DIEGO, CALIFORNIA.

VEHICLE TRAILING DEVICE.

1,087,210.

Specification of Letters Patent. Patented Feb. 17, 1914.

Application filed May 24, 1912. Serial No. 699,572.

*To all whom it may concern:*

Be it known that I, DON C. BRYAN, a citizen of the United States, and a resident of San Diego, in the county of San Diego and State of California, have invented certain new and useful Improvements in Vehicle Trailing Devices, of which the following is a specification.

My invention relates to a device to be attached to the rear of one vehicle and to the front of another for trailing purposes, and is more particularly adapted for automobiles, provided with steering rods.

The objects of my invention are, first, to provide a device of this class which may be readily attached to the rear of one vehicle and to the front of the other; second, to provide such a device that connects with the steering rod of the trailed machine for steering the same; third, to provide such a device that is simple, economical and easily constructed; fourth, to provide such a device that will fold up into a compact form when not in use; and fifth, to provide such a device that is adjustable to the various constructions of vehicles.

With these and other objects in view as will appear, my invention consists of certain novel features of construction, combination and arrangement of parts, as will be hereinafter described in detail and particularly set forth in the appended claims, reference being had to the accompanying drawings and to the characters of reference thereon which form a part of this specification, in which—

Figure 1 is a top or plan view of my device complete shown connected to the rear axle of the trailing vehicle and to the front axle of the trailed vehicle, the former vehicle portion being shown by dotted lines, Fig. 2 is a side elevational view of my device showing the axle and steering rod of the trailed vehicle in section, and Fig. 3 is a detail side elevational view of my yoke showing its connection to the differential casing.

Similar characters of reference refer to similar parts throughout the several views.

The yoke 1, connecting piece 2, guide piece 3, steering rod clamp 4, and axle clamp 5, constitute the principal parts of my device. The yoke 1 is shaped as shown best in Figs. 1 and 3. The normally horizontal members of the yoke are each provided with holes spaced apart and adapted for bolts $1^a$. These bolts support a cap $1^e$ which is of a suitable shape and size to fit over the rear axle of a vehicle and with said normally horizontal members form a clamp on said axle and said bolts are provided on their ends with nuts $1^b$. These horizontal members join some distance back of the axle where there is provided an upwardly extended ball $1^c$. This yoke is provided with a brace member $1^d$ at the junction of the two horizontal members, which extends to and is attached to the differential casing by means of the differential casing bolts. This brace member $1^d$ is my preferred construction, but the yoke may be made without it. Around the ball $1^c$ are the socket pieces $2^a$ and $2^b$ adapted to fit around said ball and form a universal joint. These pieces $2^a$ and $2^b$ are held together in front of said joint and are adapted to be tightened, to take up the wear in said joint. These pieces are provided with the extending members $2^c$ and $2^d$, each provided with holes adapted for their connection to the connecting piece 2, and on the other end of the connecting piece 2 is provided a piece $2^e$, which is provided with a hole adapted for a pivot bolt. This is the preferable construction of the piece 2, but it may be made of one piece including pieces $2^a$, $2^b$ and $2^e$, thus making them all integral parts of one piece. Pivotally mounted on the piece $2^e$ is the guide piece 3 by means of a pivot bolt $3^a$. This guide piece 3 is pivotally mounted on a vertical pin $5^a$ on the clamp 5. It is provided with a slot $3^b$ adapted for a roller $3^c$, mounted on a pin $3^d$ on the clamp 4 which is rigidly clamped to the steering rod of the trailed vehicle. On the rear end of the guide piece 3 is provided a fork $3^e$, adapted for the roller $3^c$ on the clamp 4, when the trailed vehicle steering rod is located back of the front axle instead of in front of it as shown in Fig. 1.

The clamp 5 is a plate provided with holes in each end adapted for the bolts $5^b$. This plate is provided with a plurality of holes spaced apart at various distances, to facilitate its attachment to various width axles, and on the side of the axle opposite to this plate is provided the cross bars $5^c$ through which the bolts $5^b$ extend, thus forming a clamp on the axle of the trailed vehicle.

Though I have shown and described a particular construction and arrangement of parts, I do not wish to be limited to this particular construction and arrangement, but desire to include in the purview of my invention, the construction substantially as set forth in the appended claims.

It is obvious that with this construction, there is provided a device that is simple and economical of construction; that may be readily attached to vehicles for the purpose described; that the several parts are adjustable, thus adapting them to various makes of vehicles; and that the device may be folded into a very compact form when not in use.

Having thus described my invention, what I claim as new and desire to secure by Letters Patent is:—

1. A device of the class described comprising a yoke consisting of two branch members adapted to be clamped to the rear axle, one on each side of the differential, a connecting piece connected to one end of said yoke by means of a ball and socket joint, a guide piece horizontally pivoted to the opposite end thereof, a clamp piece mounted on the front axle of another vehicle provided with an upwardly extending vertical pivot upon which said guide piece is pivotally mounted, and a clamp piece attached to a vehicle steering rod provided with an upwardly extending pivot engaging in a longitudinal slot in said guide piece whereby said steering rod is shifted with the pivotal movement of said guide piece.

2. A device of the class described comprising a yoke provided with three branch members, two of which are clamped on the rear axle of a vehicle, one on each side of the differential and the other to the differential case, an upwardly extending ball adapted for a ball joint mounted on the rear end thereof, a connecting piece connected to said yoke by means of a socket over said ball, a guide piece horizontally pivoted to the other end of said connecting piece, a clamp attached to another vehicle axle provided with an upwardly extending vertical pivot upon which said guide piece is pivotally mounted, and a clamp rigidly attached to a vehicle steering rod provided with an upwardly extending vertical axis, a roller mounted on said vertical axis inserted in a slot in said guide piece whereby said steering rod is shifted with the pivotal movement of said guide piece.

3. In a device of the class described, the combination of a yoke consisting of one central branch and two side branches rigidly secured to the rear axle of the vehicle, one side branch on each side of the differential and the central branch to the differential casing, a connecting piece connected to said yoke by means of a ball and socket joint, a guide piece horizontally pivoted to the opposite end of said connecting piece pivoted above the front axle of another vehicle on a clamp mounted on said axle provided with a slot therein, a clamp piece mounted on the steering rod of said other vehicle provided with a roller engaging with the slot in said guide piece whereby said steering rod is shifted with the pivotal movement of said guide piece on said axle.

In testimony whereof, I have hereunto subscribed my name in the presence of two subscribing witnesses.

DON C. BRYAN.

Witnesses:
HARRY E. SPIETH,
ELMER E. RODABAUGH.